(12) United States Patent
Yu et al.

(10) Patent No.: US 8,606,329 B2
(45) Date of Patent: Dec. 10, 2013

(54) METHOD AND APPARATUS FOR RENDERING WEB PAGES UTILIZING EXTERNAL RENDERING RULES

(75) Inventors: Kuifei Yu, Beijing (CN); Jyri Petteri Salomaa, Espoo (FI); Ning Yang, Beijing (CN); Biao Ren, Beijing (CN)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 13/509,993

(22) PCT Filed: Dec. 18, 2009

(86) PCT No.: PCT/CN2009/075699
§ 371 (c)(1),
(2), (4) Date: May 15, 2012

(87) PCT Pub. No.: WO2011/072454
PCT Pub. Date: Jun. 23, 2011

(65) Prior Publication Data
US 2012/0220346 A1    Aug. 30, 2012

(51) Int. Cl.
*H04B 1/38*        (2006.01)
*G06F 17/20*       (2006.01)
*G06F 17/21*       (2006.01)
*G06F 17/22*       (2006.01)
*G06F 17/24*       (2006.01)
*G06F 17/25*       (2006.01)
*G06F 17/26*       (2006.01)
*G06F 17/27*       (2006.01)
*G06F 17/00*       (2006.01)

(52) U.S. Cl.
USPC ............................ 455/566; 715/234; 715/236

(58) Field of Classification Search
USPC .................... 455/566; 715/234, 236; 345/418
See application file for complete search history.

(56) References Cited

U.S. PATENT DOCUMENTS

| | | | |
|---|---|---|---|
| 6,738,804 B1* | 5/2004 | Lo | 709/219 |
| 2007/0061410 A1* | 3/2007 | Alperin | 709/217 |
| 2010/0029340 A1* | 2/2010 | Klassen et al. | 455/566 |
| 2010/0180192 A1* | 7/2010 | Hall | 715/234 |

OTHER PUBLICATIONS

Lissa Explains it All, "html", www.lissaexplains.com, Aug. 2003.*

* cited by examiner

*Primary Examiner* — Opiribo Georgewill
(74) *Attorney, Agent, or Firm* — Ditthavong, Mori & Steiner, P.C.

(57) ABSTRACT

An approach is provided for rendering web content utilizing external rendering rules. Web content associated with a particular rendering rule is received. The web content is rendered according to a default rendering rule. The particular rendering rule is received. A viewpoint of the web content is determined. The web content is re-rendered according to the particular rendering rule at the viewpoint.

19 Claims, 12 Drawing Sheets

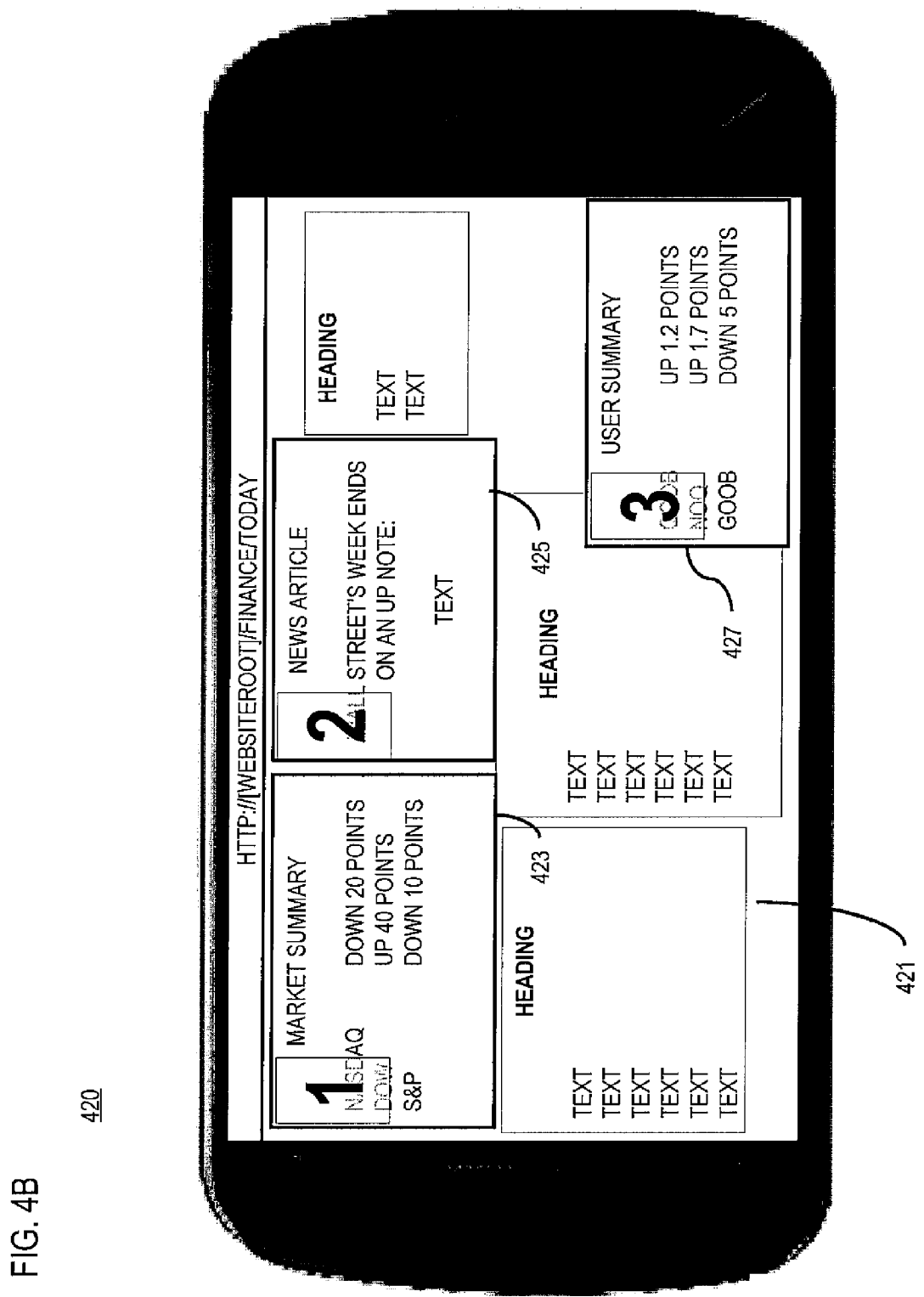

METHOD AND APPARATUS FOR RENDERING WEB PAGES UTILIZING EXTERNAL RENDERING RULES

RELATED APPLICATION

This application was originally filed as PCT Application No. PCT/CN2009/075699 filed Dec. 18, 2009.

BACKGROUND

Service providers (e.g., wireless, cellular, etc.) and device manufacturers are continually challenged to deliver value and convenience to consumers by, for example, providing compelling network services. One popular application involves browsing web pages on the World Wide Web. Currently, many web pages are designed for viewing on large screens with broadband internet connections. Often, these web pages are very large, images do not scale to smaller screen sizes, and are poorly suited for rendering on a device utilizing a small screen and/or having a limited connection. Cascading Style Sheets (CSS) may be utilized on web pages to represent the content on web pages. With CSS, web pages may be rendered and useful on large screen and/or broadband devices as well as smaller screen and/or limited connection devices. However, utilizing CSS on devices may limit a user's experience browsing content over the web in other ways because the CSS is additional information that the device needs to download.
Some Example Embodiments Therefore, there is a need for an approach for rendering web content utilizing external rendering rules.

According to one embodiment, a method comprises receiving web content associated with a particular rendering rule. The method also comprises rendering the web content according to a default rendering rule. The method further comprises receiving the particular rendering rule. The method additionally comprises determining a viewpoint of the web content. The method further comprises re-rendering the web content according to the particular rendering rule at the viewpoint.

According to another embodiment, an apparatus comprising at least one processor, and at least one memory including computer program code, the at least one memory and the computer program code configured to, with the at least one processor, cause, at least in part, the apparatus to receive web content associated with a particular rendering rule. The apparatus is also caused to render the web content according to a default rendering rule. The apparatus is further caused to receive the particular rendering rule. The apparatus is additionally caused to determine a viewpoint of the web content. The apparatus is further caused to re-render the web content according to the particular rendering rule at the viewpoint.

According to another embodiment, a computer-readable storage medium carrying one or more sequences of one or more instructions which, when executed by one or more processors, cause, at least in part, an apparatus to receive web content associated with a particular rendering rule. The apparatus is also caused to render the web content according to a default rendering rule. The apparatus is further caused to receive the particular rendering rule. The apparatus is additionally caused to determine a viewpoint of the web content. The apparatus is further caused to re-render the web content according to the particular rendering rule at the viewpoint.

According to another embodiment, an apparatus comprises means for receiving web content associated with a particular rendering rule. The apparatus also comprises means for rendering the web content according to a default rendering rule. The apparatus further comprises means for receiving the particular rendering rule. The apparatus additionally comprises means for determining a viewpoint of the web content. The apparatus further comprises means for re-rendering the web content according to the particular rendering rule at the viewpoint.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A-4F are diagrams of user interfaces utilized in the processes of FIG. 3, according to various embodiments;

DESCRIPTION OF SOME EMBODIMENTS

Examples of a method, apparatus, and computer program for presenting web pages utilizing external rendering rules are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Figure 1:
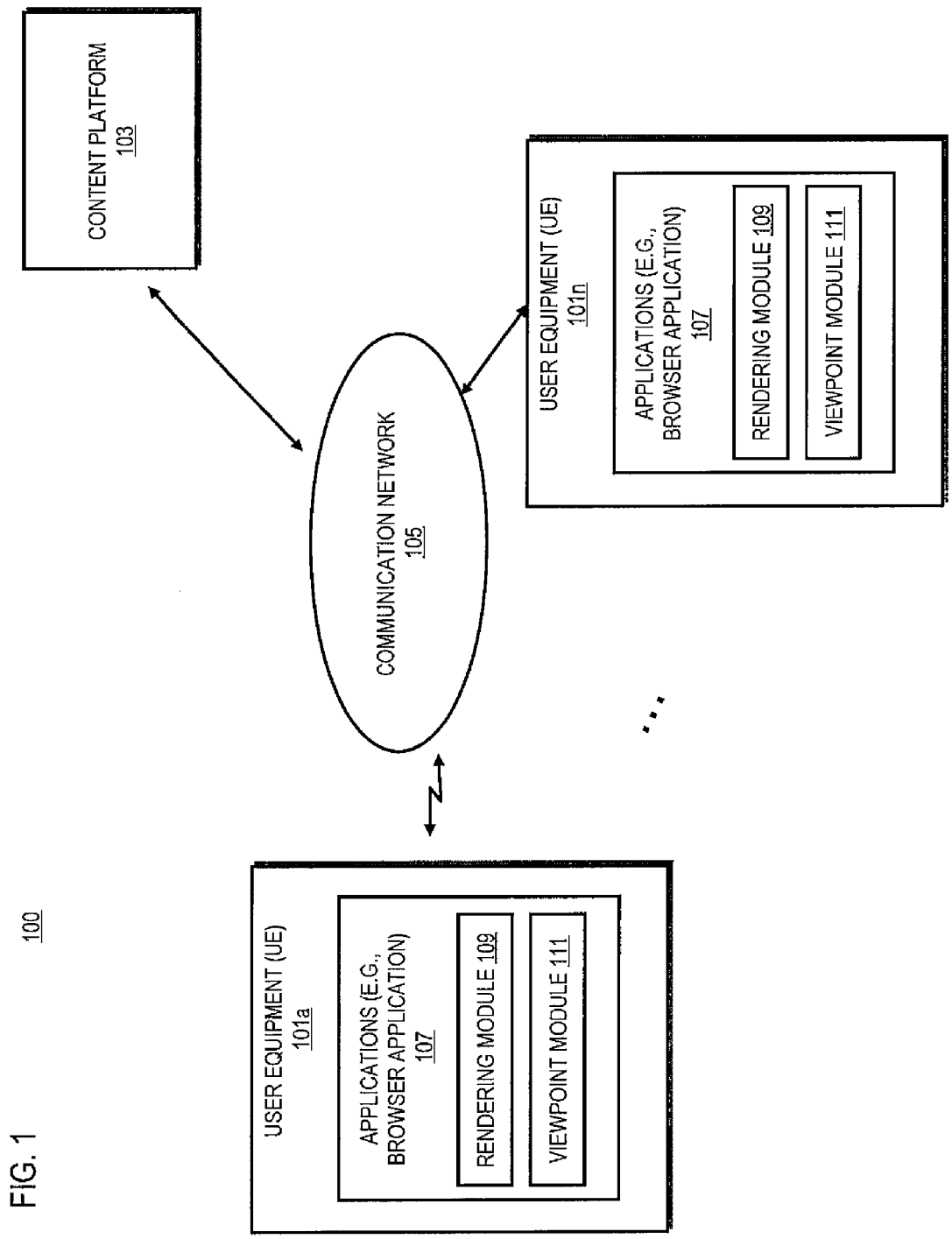
FIG. 1 is a diagram of a system capable of utilizing external rendering rules, according to one embodiment.

FIG. 1 is a diagram of a system capable of utilizing external rendering rules to present web content, according to one embodiment. The use of web content rendering rules (e.g., Cascading Style Sheets (CSS)) is increasingly utilized by web sites to present web content to users. As used herein, the term "web content" is any information that may be retrieved from the internet. By way of example, web content may include text, links, images, video, audio, other media, and other information that may be stored on a web page and/or a website. A web page may embed CSS rendering rules within a language (e.g., a markup language such as hypertext markup language (HTML)) associated with the web page. Further, the web page may link to a file including the rendering rules (e.g., a CSS file) for presenting the web content. Because the web content is separated from the rendering rules, there is less dependence between web content and the representation of the web content. As such, the same web content can be rendered into a representation using many different rendering rules.

Two approaches to render web content at a device using the CSS file include rendering the web content once both the web content and the CSS file are downloaded and rendering the web content using a default rendering rule and then re-rendering web content according to the CSS file after the CSS file is downloaded. With the first approach, the CSS file needs to be downloaded before any presentation is made to the user of the device. According to the second approach, the web content is first rendered using a default rendering rule and presented to the user of the device. Thus, the user may begin viewing the web content while the CSS file is being downloaded. Then, when the web content is re-rendered by the device, the presentation is reset and thus, the user of the device may lose the view that the user is viewing. This loss of view is leads to a poor user experience for the user because the user will have to navigate the web content once again to return to the information that the user wishes to view. This may leave the user feeling poorly about the device and/or service provider, which may cause the user to switch devices and/or services.

To address this problem, a system 100 of FIG. 1 introduces the capability to re-render the web content while accounting for the position or view within the web content that the user is presented before the re-rendering process. According to this approach, the user may utilize user equipment (UEs) 101a-101n to receive web content (e.g., web pages) from a content platform 103 via a communication network 105. In certain embodiments, a UE (e.g., UE 101a) may be connected to the communication network 105 via a wireless connection or a UE (e.g., UE 101n) may be connected via a wired connection. The UE 101 may include a browser application 107 to retrieve and render the web content from the content platform 103. As the browser application 107 downloads web content from the content platform 103, the UE 101 can present the web content using a rendering module 109. The rendering module 109 may render web content using default rendering rules or using particular rendering rules associated with the web content. As mentioned previously, the particular rendering rules may be included in a file (e.g., a CSS file) that may be linked to by the web content. While waiting for the file to be downloaded, the rendering module 109 may render the web content according to the default rendering rules and the UE 101 may present the rendered web content on a graphical user interface (GUI). A viewpoint module 111 may be used to determine a viewpoint of the GUI. In certain embodiments, the term viewpoint refers to a focus point or area of the web content that the user is viewing.

The viewpoint module 111 may determine the viewpoint based on one or more rules and/or selections by the user. For example, a rule may specify that a point on the GUI is used to determine what section of the web content the user is viewing. According to certain embodiments, a "section of web content" may be a portion of the web content that is displayed on the GUI. A section may be defined by code (e.g., via using HTML div elements) used to separate portions of the web content. These sections may be rendered by the rendering module 109 utilizing rendering rules to present the section and/or other sections of web content on the GUI. Further, the sections of web content may be hierarchically grouped so that a section may include additional sections within the section. The viewpoint module 111, as part of the browser application 107, has access to information regarding what sections of the web content are being presented on the GUI at a given time as well as what portions of the sections are being presented and the locations of those portions. In one scenario, the one or more rules for determining what section of web content the user is looking at may be based on a location of the GUI. For example, the top left corner and the center of the GUI are statistically likely places to be the location on the GUI that is being looked at by the user. Thus, one rule can be to determine that the user is looking at the center of the GUI or the top left portion of the GUI. In other scenarios, the rule may be based on how much a section covers the GUI. For example, the viewpoint module 111 may determine or ascertain what area coverage of each section is displayed on the GUI. The rule may determine that the user is looking at the section that has the most area coverage displayed on the GUI. In other scenarios, the rule can be utilized to determine what location is being viewed based on user input. For example, the user may use a mouse cursor, touch screen, etc. to select (e.g., via hovering over a location, clicking on a location, etc.) the section. Moreover, the user need not know that the user is selecting the viewpoint. In other embodiments, the user can explicitly select the viewpoint. A number or other shortcut information may be transposed above sections as further detailed in FIG. 4B. The numbers and/or shortcut information may be associated with the keys on a keypad or keyboard associated with the UE 101. The user may select the viewpoint by pressing the corresponding key on the keypad.

Further, in another example, eye movement recognition may be utilized to select the section. In this example, the UE 101 may include an image capture device (e.g., a camera) pointed towards the user (e.g., the image capture device is mounted on the same portion of the UE 101 as a screen of the UE 101). The browser application 107 detects one or more of the user's eyes to focus upon using conventional eye movement technologies. Once detected, the browser application 107 triangulates where the one or more eyes are focusing on, using the camera's relationship to the screen to determine where the user is looking, and thus the section the user is looking at.

The viewpoint module 111 may select the section that the user is looking at when the particular rendering rule is downloaded or based on other criteria (e.g., based on when the particular rendering rule is ready to be used by the browser application). Then, the particular rendering rule is utilized by the rendering module 109 to render the content at the selected section. This section may be a focal point for the web content to be presented via the GUI after the re-rendering. Thus, the selected section of the web content may be presented at a certain location of the GUI, thereby providing the user with the ability to view the selected section without need for navigating the GUI to return to the section that the user was viewing before the content was re-rendered using the particular rendering rule. By automatically returning the user the focal point of the content after re-rendering, the viewpoint module 111 advantageously reduces the number steps, clicks, or commands that the user inputs into the browser application 107 to find content of interest.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), a public data network (e.g., the Internet), or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), satellite, mobile ad-hoc network (MANET), and the like.

The UE 101 is any type of mobile terminal, fixed terminal, or portable terminal including a mobile handset, station, unit, device, multimedia computer, multimedia tablet, Internet node, communicator, desktop computer, laptop computer, Personal Digital Assistants (PDAs), or any combination thereof. It is also contemplated that the UE 101 can support any type of interface to the user (such as "wearable" circuitry, etc.).

By way of example, the UE 101, and content platform 103 communicate with each other and other components of the communication network 105 using well known, new or still developing protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

Figure 2:
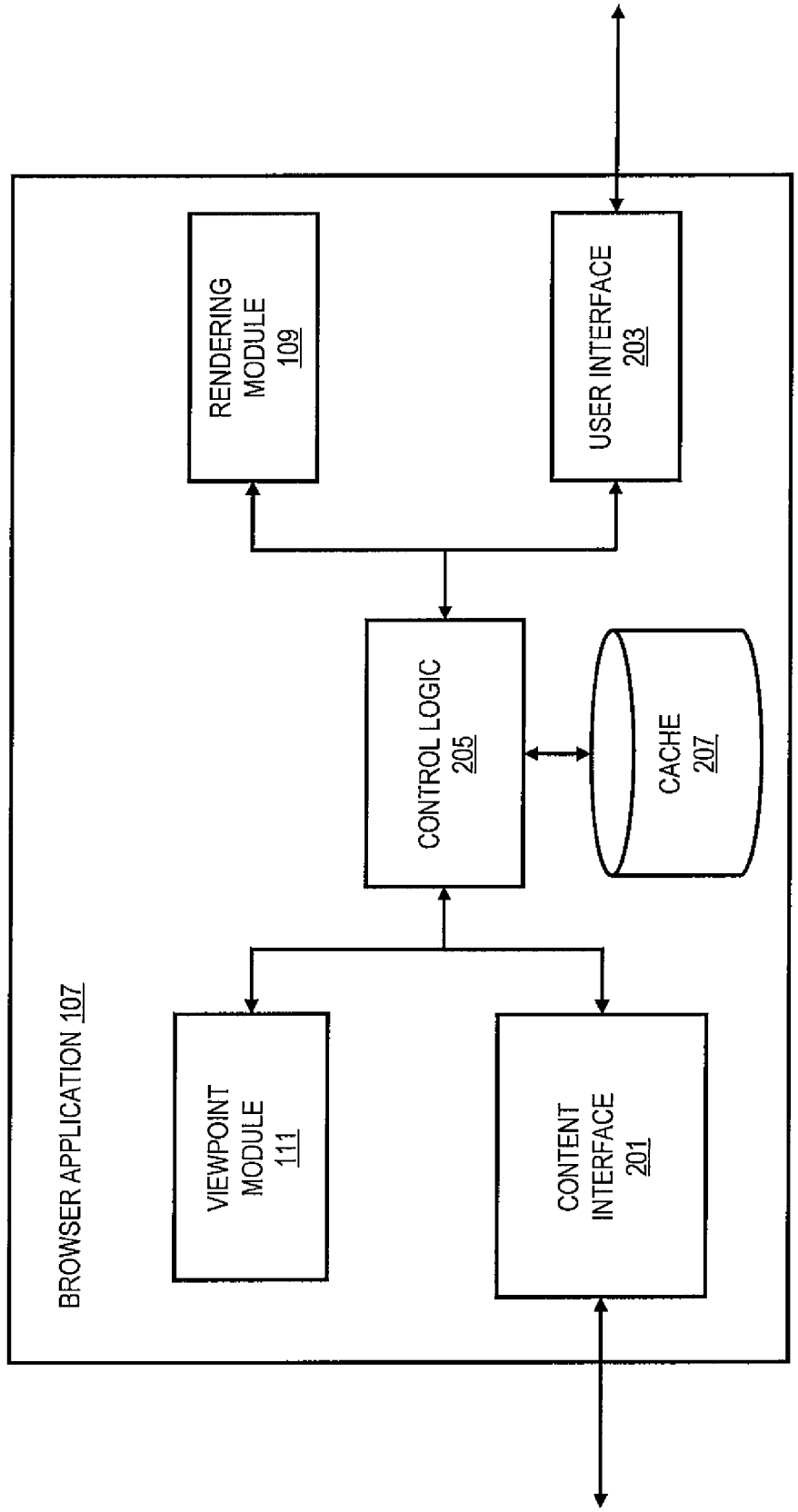
FIG. 2 is a diagram of the components of a browser application, according to one embodiment.

FIG. 2 is a diagram of the components of a browser application, according to one embodiment. By way of example, the browser application 107 includes one or more components for utilizing external rendering rules to present web content. It is contemplated that the functions of these components may be combined in one or more components or performed by other components of equivalent functionality. In this embodiment, the browser application 107 includes a content interface 201 to retrieve web content from a content platform 103, rendering module 109 to process the web content for presentation, a user interface 203 to present the web content, a viewpoint module 111 to determine what part of the web content that a user of the browser application 107 is viewing, control logic 205 to execute the processes of the browser application 107, and a cache 207 to store data.

The content interface 201 can be used to communicate with a content platform 103. Certain communications can be via methods such as an internet protocol, messaging, or any other communication method (e.g., via the communication network 105). In some examples, the content interface 201 is utilized to upload and download information to and from the content platform 103. As such, the content interface 201 may be utilized to download web content and rendering rules from one or more content platforms 103. Thus, the content interface 201 provides means for receiving web content and rendering rules. In certain scenarios, a content platform 103 provides the web content along with a link to another content platform 103 that provides the rendering rules for displaying the web content. Once web content is downloaded, it may be rendered by the rendering module 109 and presented on the user interface 203.

The user interface 203 can include various methods of communication. For example, the user interface 203 can have outputs including a visual component (e.g., a screen), an audio component, a physical component (e.g., vibrations), and other methods of communication. User inputs can include a touch-screen interface, a scroll-and-click interface, a button interface, a microphone, etc. Thus, the user interface 203 can provide means for selecting a section of the web content. Moreover, the user interface 203 may be used to display a GUI. The GUI may be utilized to present the web content. Thus, the user interface 203 provides a means for presenting the GUI. Exemplary user interfaces according to various embodiments are presented in FIGS. 4A-4F.

Under one scenario, the browser application 107 is caused to, via input from the user interface 203, retrieve web content from the content platform 103 via the content interface 201. The browser application 107 begins retrieving web content, renders the web content using a default rendering rule associated with the rendering module 109, and displays the web content via a GUI of the user interface 203. Additionally, as noted previously, the browser application 107 downloads a file containing a particular rendering rule(s) associated with the web content. This file may be stored in the cache 207 so that the next time the particular rendering rule(s) is utilized, the browser application 107 need not download it. As the particular rendering rule is being downloaded, the viewpoint module 111 determines a viewpoint of the user while the user is viewing the web content based on the default rendering rule. When the particular rendering rule is retrieved, the rendering module 109 uses the particular rendering rule to re-render the web content at the viewpoint. In other words, the rendering module 109 refreshes the display of the web content from the default rendering rule to the particular rendering rule. Thus, the rendering module 109 provides means for rendering web content according to one or more rendering rules. In many cases, the particular rendering rule applies a different style or format to the web content than applied by the default rendering rule, which causes the web content to appear in different positions with respect to the interface of the browser application 107. In one embodiment, the rendering module 109 re-renders the web content beginning at the user's viewpoint location determined by the viewpoint module 111. In another embodiment, the rendering module 109 first re-renders all of the web content and then automatically shifts the focal area to the previously determined viewpoint. With this approach, the user is able to view web content based on one rendering rule and not lose the position or place the user has navigated to when the web content is re-rendered based on a particular rendering rule.

Figure 3:
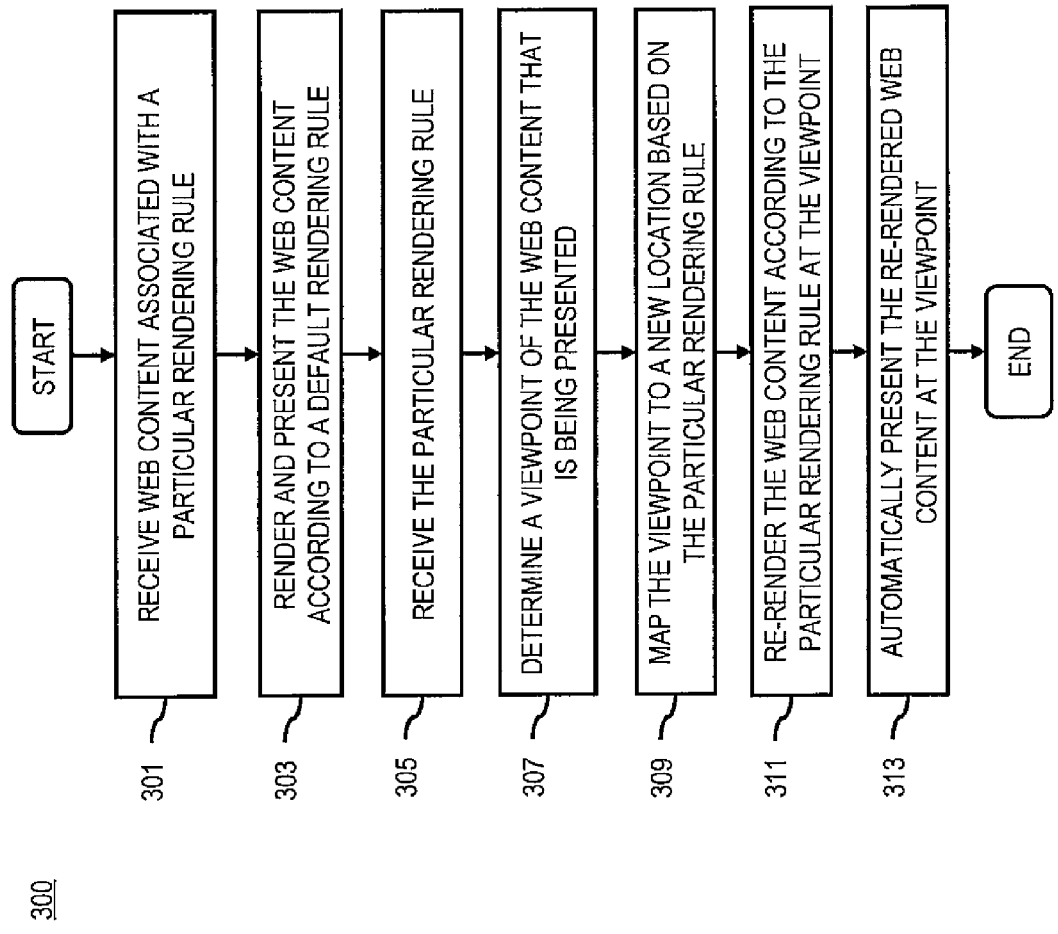
FIG. 3 is a flowchart of a process for presenting web content to a user according to rendering rules, according to one embodiment.

FIG. 3 is a flowchart of a process for presenting web content to a user according to rendering rules, according to one embodiment. In one embodiment, the control logic 205 performs the process 300 and is implemented in, for instance, a chip set including a processor and a memory as shown FIG. 6. A browser application 107 associated with the control logic 205 receives input via a user interface 203 for presentation of web content. The control logic 205 causes the content interface 201 to request and download the web content for presentation via a GUI.

In step 301, the control logic 205 receives web content associated with a particular rendering rule. As noted above, the web content or other web content may link to a file including the particular rendering rule. In certain examples, the particular rendering rule may be included as part of a CSS file associated with web content that includes HTML code. As such, the particular rendering rule may include CSS code. Further, the HTML code may include sections of web content (e.g., divided using div elements, span elements, etc.). Table 1 includes exemplary code utilized to describe a section of web content.

TABLE 1

```
<div id="pageHeader">
<h1><span>css Title 1</span></h1>
<h2><span>Title 2 <acronym title="Cascading Style Sheets">CSS</acronym>
Design</span></h2>
</div>
```

As described in Table 1, the section includes a two part title. This title may be associated with CSS information. Thus, CSS rendering rules may be utilized to render and present the content in the section in different manners. Using the CSS rendering rules, the titles may be presented in different sections of the layout of the web page. Further, the CSS rendering rules may be utilized to change the size, shape, font, and other stylistic effects of the content.

As the control logic 205 is downloading the web content and the particular rendering rule, the control logic 205 may cause rendering and presentation of the web content according to a default rendering rule (step 303). The web content may be rendered and presented while the web content is downloading (e.g., partial web content may be rendered). As discussed previously, the partial web content typically includes at least a portion of the web content that can be rendered, but not the complete particular rendering rule for displaying the content. The particular rendering rule is generally available when all of the web content has been downloaded. The timing difference between receiving the first portion of the web content to when the complete web content and particular rendering rule can be significant depending on the network connection speed. Therefore, a user typically would have a significant period of time (e.g., 30 seconds to 1 minute) to browse the partial web content before the particular rendering rule can be applied. Under certain scenarios, the web content is presented via a GUI. The default rendering rule can present the web content or partial web content in sections (e.g., sections defined by HTML div elements demarcated by "<div>" and "</div>"). During some point of rendering the web content using the default rendering rule, the particular rendering rule is received and the download of the particular rendering rule completed (step 305).

When the particular rendering rule is received, the control logic 205 may determine a viewpoint of the web content that is being presented (e.g., the position within the web content as rendered under the default rendering rule that the user is currently viewing) (step 307). Under certain scenarios, the viewpoint may be determined continuously while the control logic 205 uses the rendering module 109 to render the web content according to the default rendering rule. As noted above, the viewpoint may be determined based on viewpoint selection criteria. The viewpoint selection criteria can be can be retrieved from a memory of the UE 101. In one embodiment, the viewpoint selection criteria include a point or area of the GUI that is assumed to be the focal point of the user. Then, the viewpoint module 111 determines a section of the web content that is associated with the viewpoint. As further detailed in FIG. 4D, the web viewpoint selection criteria can be based on a statistical analysis of user navigation. For example, the top left corner of the GUI, the center of the GUI, or a portion of the GUI above the center of the GUI can be the point or area. In certain embodiments, multiple levels of sections may be available for selecting the viewpoint as previously mentioned. When there are above a predetermined threshold number of available sections to choose from presented on the screen, lower level (e.g., more detailed) sections may be eliminated from the available sections for selecting the viewpoint. Further, if there are fewer higher level sections (e.g., overview sections) presented on the GUI, but there are at least or more than a predetermined threshold number of lower level sections, the higher level sections may be eliminated from the available sections for selecting the viewpoint. By way of example, the predetermined thresholds may be determined based on a user preference and/or resolution or screen size of the GUI.

In yet another embodiment, the viewpoint selection criteria includes rules for selecting or determining a section of the web content based on the prominence of the section in regards to the GUI. For example, the section of the web content with the largest text area showing may be determined to be the viewpoint of the user. In yet another embodiment, if only one section of the web content is being displayed, the section associated with the entire screen may be selected. Additionally, the selection criteria may include a manner in which the viewpoint may be selected based on user input. For example, the user may utilize a touch screen interface or a mouse cursor to navigate the GUI. In this scenario, a section associated with the last point touched or clicked on is determined to be the viewpoint. In another example, as noted above, the selection may be based on eye movements to determine what section the user is focused upon. Moreover, the selection process may be based on a timing threshold allowing the user to select and change the viewpoint before the threshold timer runs out. In certain scenarios, if the user does not select the viewpoint within the threshold time, the web content may be optionally rendered and re-rendered without focusing in on the viewpoint. In this manner, the user may enjoy the web content if the user is unaware of and/or does not care about the content the user was previously viewing. The threshold may additionally depend on the receiving of the file including the particular rendering rule (e.g., the timer expires based on the reception of the particular rendering rule). In a similar manner, a mouse cursor hovering over the point may be used to determine the viewpoint. Moreover, the control logic 205 may cause presentation of the GUI with selection options that the user may input data into the UE 101 to determine the section of the web content that is associated with the viewpoint as further detailed in FIGS. 4B and 4C. The selected viewpoint and/or section may be stored in a memory of the UE 101.

Then, at step 309, the control logic 205 maps the selected viewpoint to a new location based on the particular rendering rule. This may occur while the control logic 205 causes the rendering module 109 to re-render (e.g., rendering the web once again) the web content according to the particular rendering rule at the viewpoint (step 311). In certain embodiments, the re-rendering process includes laying out the sections in a manner in accordance with the particular rendering rule. As the web content is re-rendered, the control logic 205 can cause the rendering module 109 to render the web content beginning with the section of web content associated with the viewpoint. Alternatively or additionally, other sections of the web content may be re-rendered using the particular rendering rule and the control logic 205 can focus the presentation of the GUI onto the selected viewpoint. Further, the presentation of the re-rendered web content at the selected viewpoint may be automatically presented to the user (step 313). This presentation may be automated based on the receipt of the particular content rule (e.g., the presentation may be updated once it is determined that the particular content rule is received).

Figure 4A:
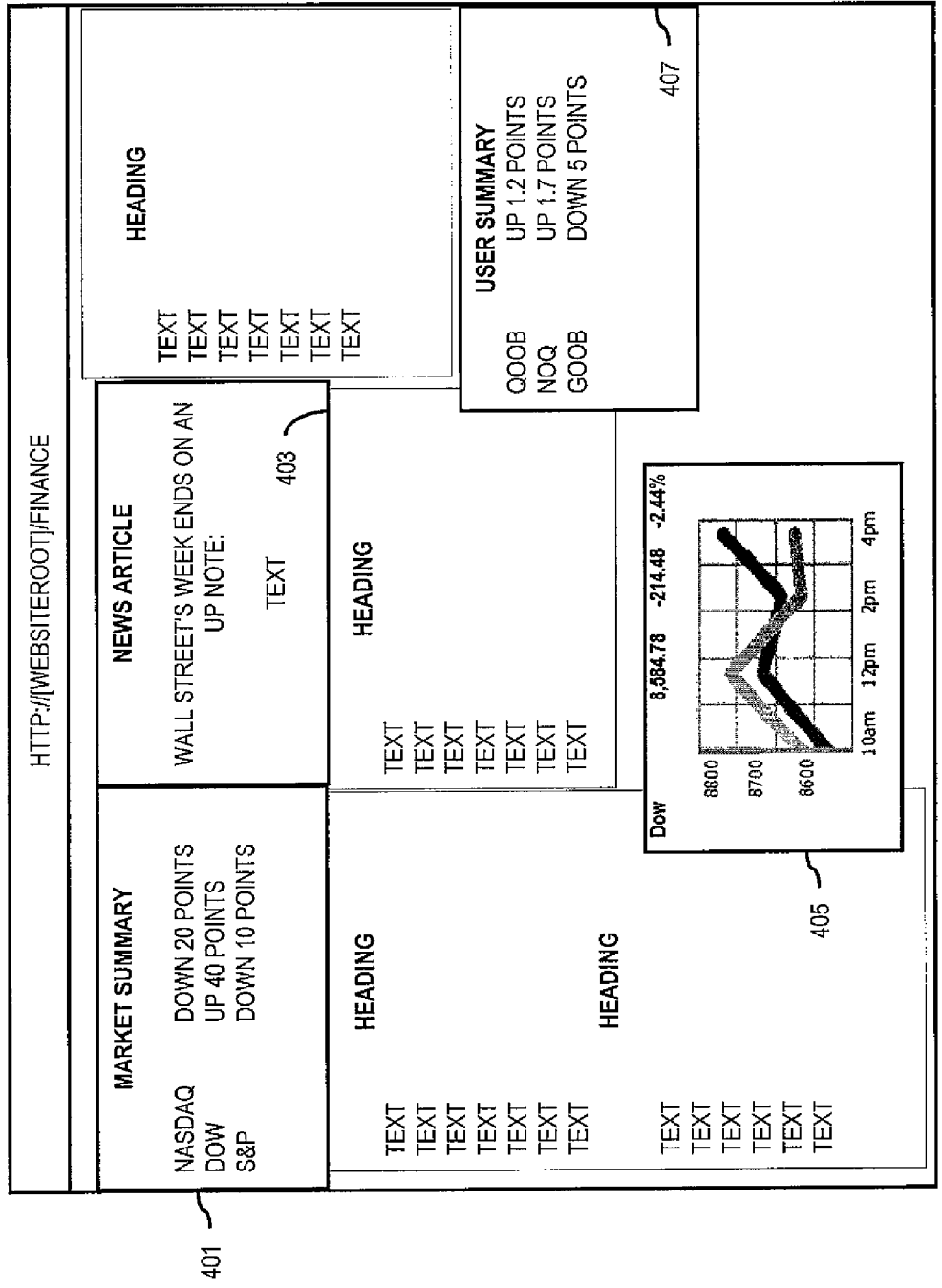

FIGS. 4A-4F are diagrams of user interfaces utilized in the processes of FIG. 3, according to various embodiments. FIG. 4A displays example sections 401, 403, 405, 407 of web content displayed on a user interface (UI), of a web page 400. By way of example, the web page represents a financial news site. In this embodiment, the user begins viewing the web page at a market summary section 401, moves on to a news section 403, a stock market chart section 405, and then ends the viewing at a user summary area 407 providing information about stocks that the user has recently looked up. A viewpoint module 111 detects movements (e.g., cursor control information, etc.) on each of the sections 401, 403, 405, 407. This large web page may be considered web content utilized in the presentation of web content further detailed in FIGS. 4B-4F. Moreover, the sections in the web content of FIG. 4A may be rendered and laid out according to a default rendering rule.

Figure 4C:
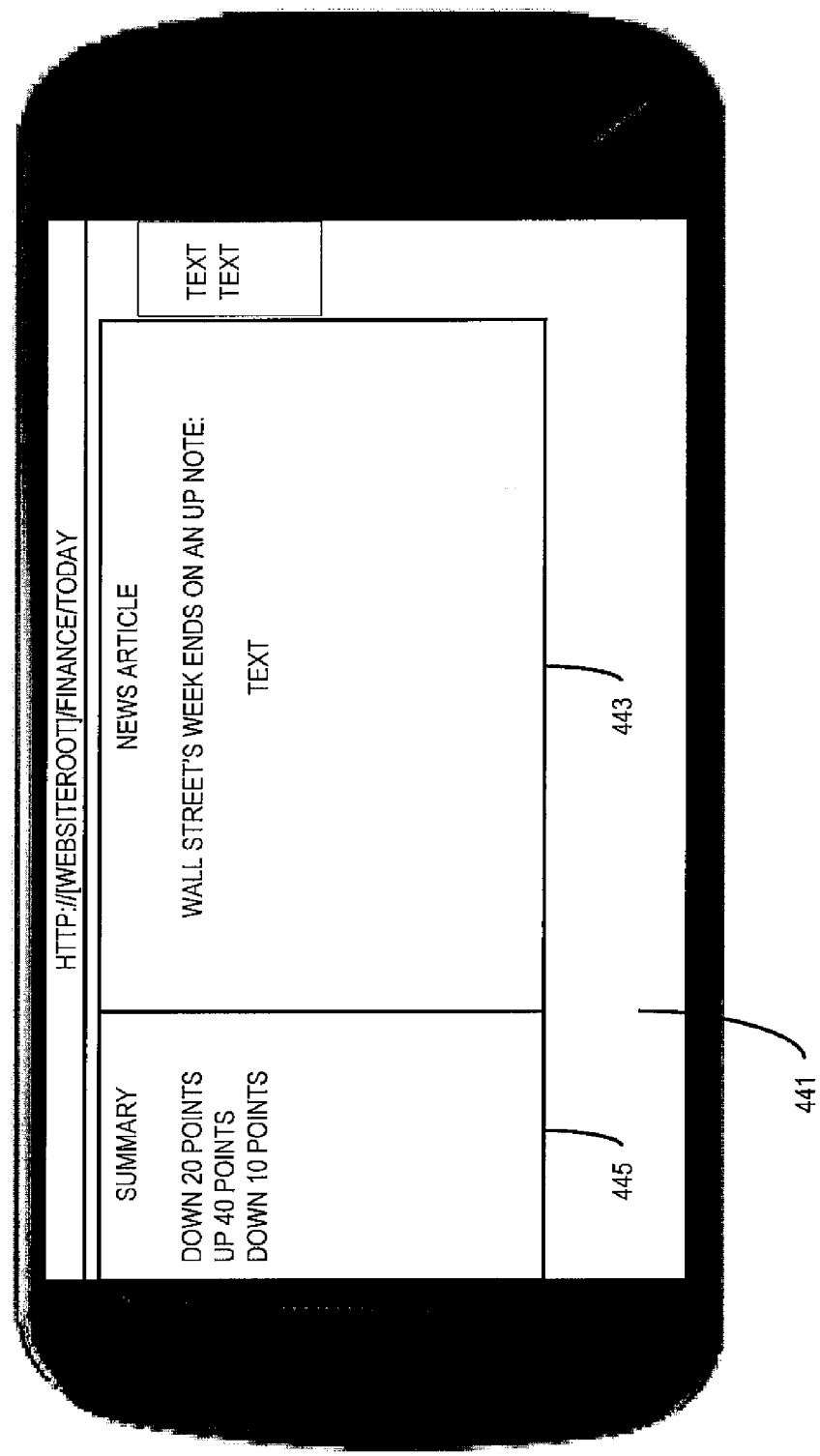
Figure 4D:
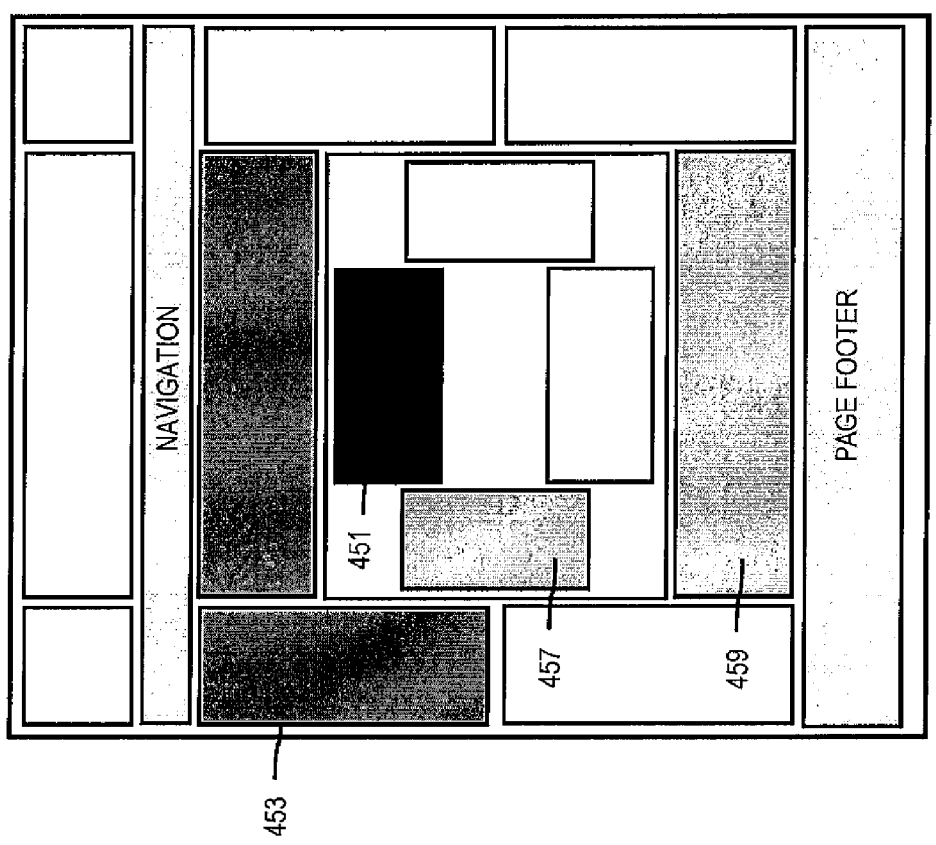

FIG. 4B is a diagram of a user interface utilized in the processes of FIG. 3 to select a viewpoint, according to one embodiments. In this embodiment, the user interface 420 displays web content that includes a web page 421, which may be a portion of the web page 400 of FIG. 4A. In one embodiment, the web page 421 has a web page structure that divides the web content into at least sections 423, 425, 427. Further, the page is rendered according to a default rendering rule. The user interface 420 displays a portion of the web page 421 with overlay selection options as sections on top of the web page 421. The user interface overlay selection options may be labeled using numerals (e.g., 1, 2, 3) that may be associated with keys of the UE 101 to select the sections as viewpoints. Other selection processes are also available (e.g., touching via a touch screen, clicking via a mouse cursor, etc.). In certain examples, when the section is selected, the section may be highlighted to emphasize to the user that the section is selected. Further, this FIG. 4C is a diagram of a user interface 440 utilized to select a viewpoint, according to one embodiment. This user interface 440 may be presented according to a default rendering rule. In this embodiment, web content including the web page 441 includes the web page 440, 421 of FIGS. 4A and 4B. In this embodiment, the user navigates to focus on the news article section 443. Viewpoint selection criteria may be utilized to select which section 443, 445 to display. An exemplary user interface 450 of viewpoint selection criteria is displayed in FIG. 4D. According to this diagram, the primary content that viewers statistically look at includes the area 451 just above the center point of the screen. Secondary portions of the user interface 450 that may include the top left corner area 453 of the viewable portion of the user interface 450. Additional locations of interest may include the top center area 455 of the viewable content portion of the user interface 450, left center area 457 of the user interface 450, and the bottom center area 459 of the web content. However, users may have different particular viewing habits and any portion of the user interface 450 may be utilized in the criteria to determine a viewpoint. In certain embodiments, the criteria may include an area 451, wherein the section (e.g., sections 443, 445) that is selected for the viewpoint is the section that covers the greatest amount of the area 451. In other embodiments, the criteria may be a point, where only one section is associated with the point. As such, in one embodiment, the news article section 443 of FIG. 4C may be selected based on the criteria as the area of content that is being viewed.

Figure 4E:
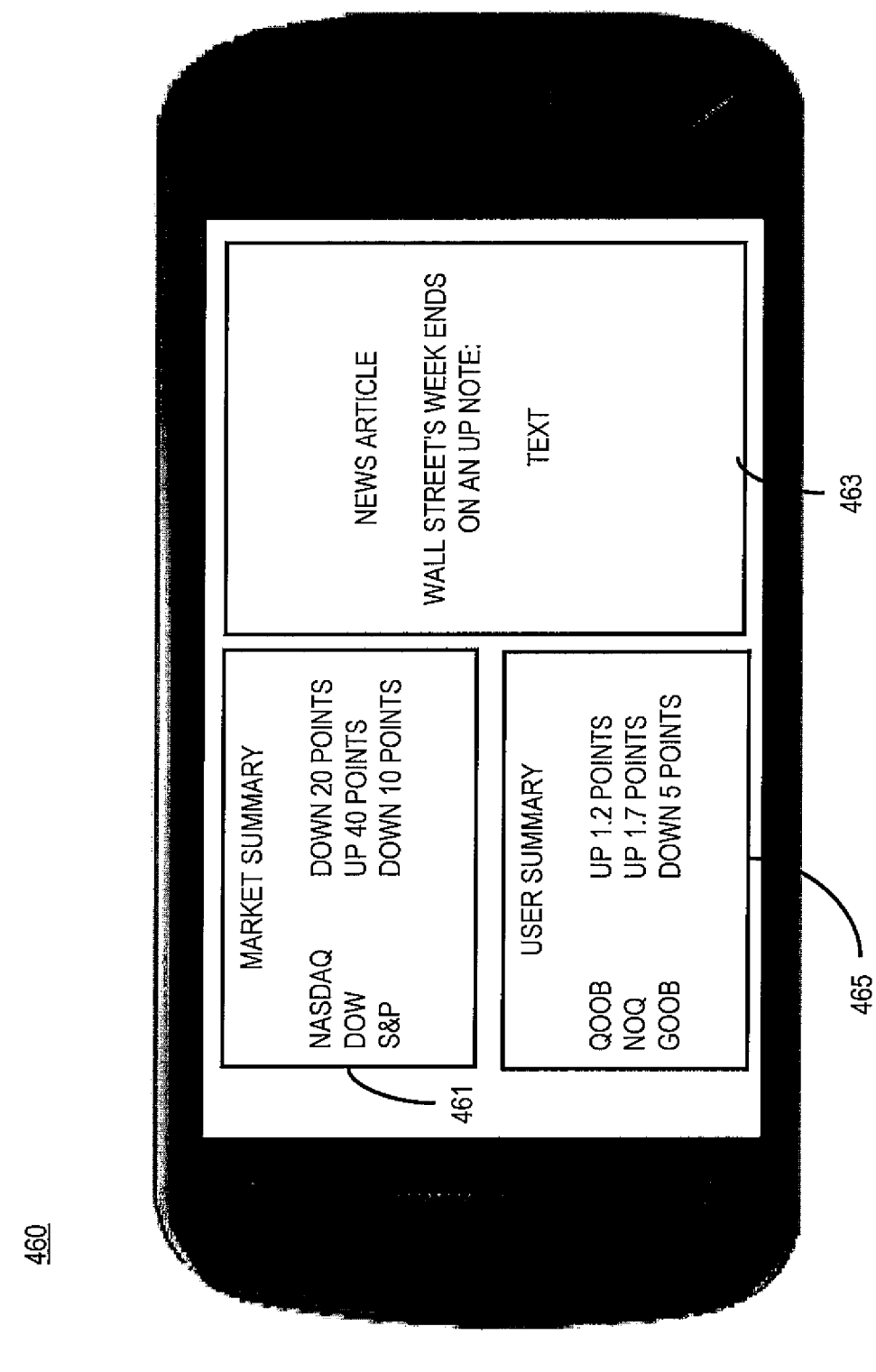

FIG. 4E is a diagram of a user interface 460 that represents a re-rendered version of user interfaces 420, 440, according to one embodiment. In this embodiment, the market summary section 423, news article section 425, and user summary section 427 are mapped onto different locations (e.g., market summary section 461, news article section 463, user summary section 465). If the viewer was viewing the stock market chart section 405 of FIG. 4A when the web content was re-rendered, the viewer would lose what the user was viewing when the content was re-rendered. In this case, the user would need to navigate the user interface 460 to return to the viewpoint the user previously had.

Figure 4F:
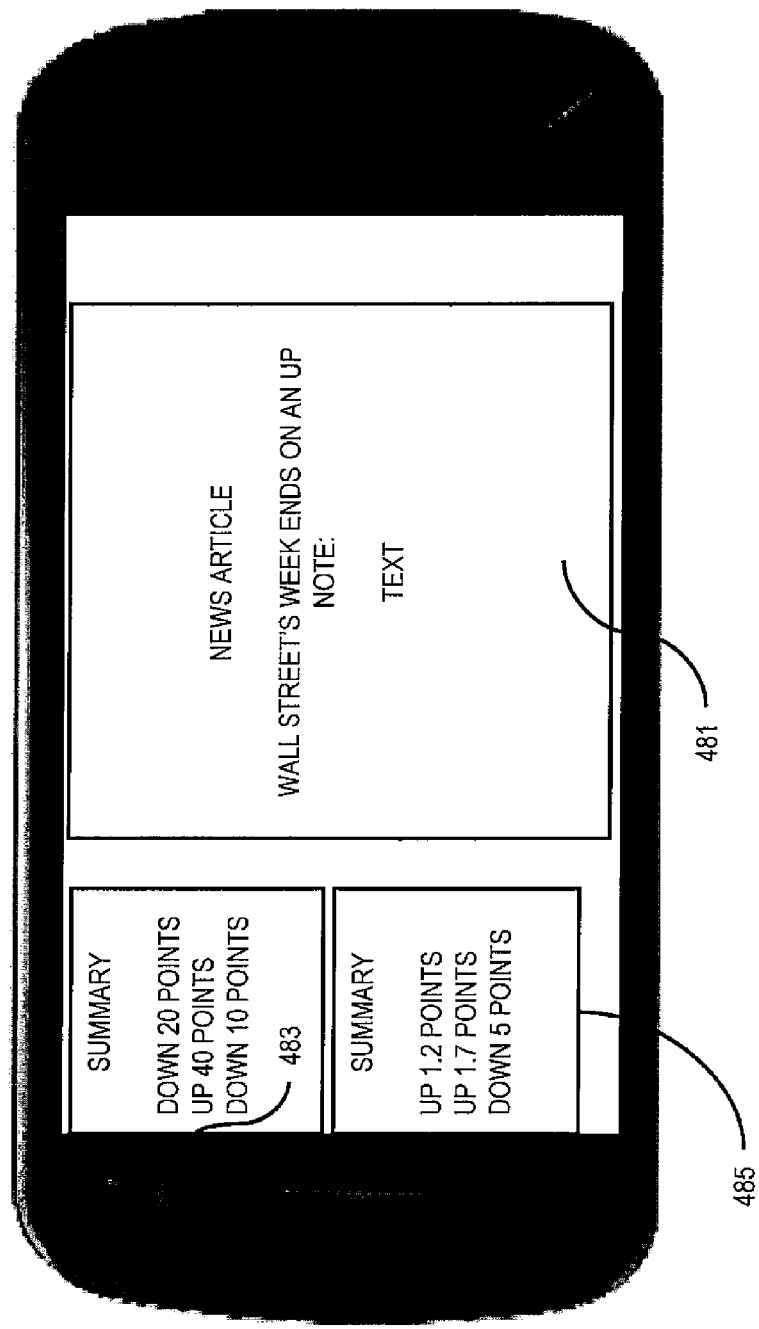

FIG. 4F is a diagram of a user interface 480 that represents a re-rendered version of user interface 440, according to one embodiment. In this embodiment, the news article section 481 is selected as the viewpoint of user interface 440 based on viewpoint selection criteria. When the user interface 440 is re-rendered, the news article section 481 is brought into prominence on the user interface 480. In certain embodiments, the placement of the news article section 481 may be based on mapping rules. The mapping rules can be used to determine where the selected viewpoint should be displayed on the user interface 480. In certain embodiments, this may be the top left section of the screen. In other embodiments, this may be the center or an off center of the user interface 480. Moreover, the mapping rule may be utilized to take into consideration the rest of the web content. For example, if the section associated with the viewpoint is on the right hand side of the re-rendered user interface (e.g., user interface 460), instead of centering the section on the user interface 480, the section may be presented towards the right hand side of the user interface 480. In this manner other sections 483, 485 may also be presented via the user interface 480.

With the above approach, a user is able to browse web content using a UE 101 in a customized manner. In this manner, the web content may be rendered for the user using a default rendering rule until a particular rendering rule is downloaded. This may take some time if the UE 101 has a limited connection to the internet (e.g., limited bandwidth due to capabilities of the communication network 105 or the UE 101). During this time, the user may navigate the web content using the default rendering rule, the location that the user is viewing is captured. When the particular rendering rule is received, the web content may be re-rendered using the particular rendering rule. Moreover, the captured view of the user may be automatically presented to the user. In this manner, the user need not re-navigate the re-rendered content to arrive at the captured view. This can save battery life on a mobile device by limiting the amount of time the user wastes re-navigating to the section of web content the user would like to view.

The processes described herein for providing rendering of web content utilizing external rendering rules may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 5:
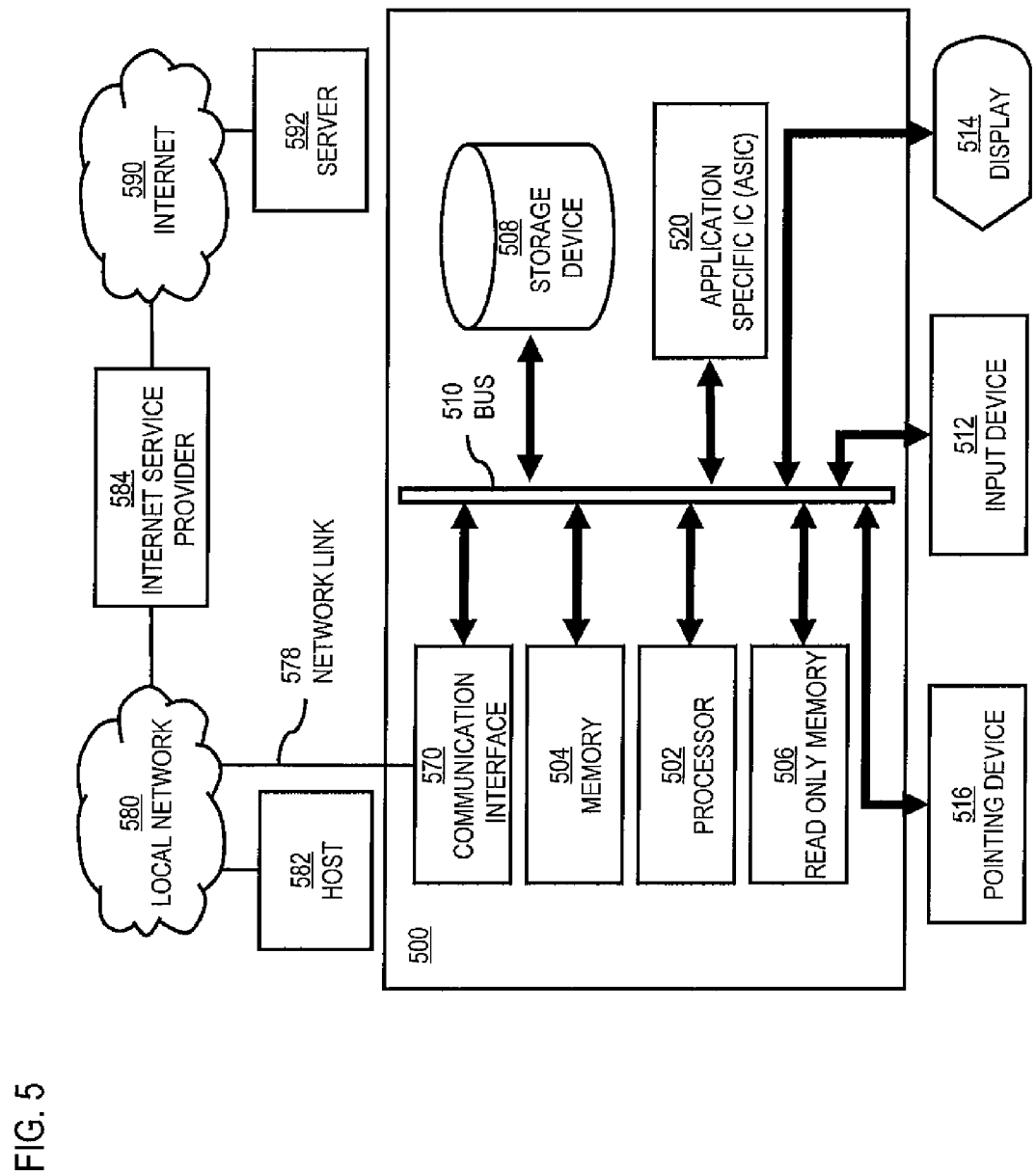
FIG. 5 is a diagram of hardware that can be used to implement an embodiment of the invention.

FIG. 5 illustrates a computer system 500 upon which an embodiment of the invention may be implemented. Although computer system 500 is depicted with respect to a particular device or equipment, it is contemplated that other devices or equipment (e.g., network elements, servers, etc.) within FIG. 5 can deploy the illustrated hardware and components of system 500. Computer system 500 is programmed (e.g., via computer program code or instructions) to render web content utilizing external rendering rules as described herein and includes a communication mechanism such as a bus 510 for passing information between other internal and external components of the computer system 500. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range. Computer system 500, or a portion thereof, constitutes a means for performing one or more steps of rendering web content utilizing external rendering rules.

A bus 510 includes one or more parallel conductors of information so that information is transferred quickly among devices coupled to the bus 510. One or more processors 502 for processing information are coupled with the bus 510.

A processor 502 performs a set of operations on information as specified by computer program code related to rendering web content utilizing external rendering rules. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 510 and placing information on the bus 510. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 502, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 500 also includes a memory 504 coupled to bus 510. The memory 504, such as a random access memory (RAM) or other dynamic storage device, stores information including processor instructions for rendering web content utilizing external rendering rules. Dynamic memory allows information stored therein to be changed by the computer system 500. RAM allows a unit of information stored at a location called a memory address to be stored and retrieved independently of information at neighboring addresses. The memory 504 is also used by the processor 502 to store temporary values during execution of processor instructions. The computer system 500 also includes a read only memory (ROM) 506 or other static storage device coupled to the bus 510 for storing static information, including instructions, that is not changed by the computer system 500. Some memory is composed of volatile storage that loses the information stored thereon when power is lost. Also coupled to bus 510 is a non-volatile (persistent) storage device 508, such as a magnetic disk, optical disk or flash card, for storing information, including instructions, that persists even when the computer system 500 is turned off or otherwise loses power.

Information, including instructions for rendering web content utilizing external rendering rules, is provided to the bus 510 for use by the processor from an external input device 512, such as a keyboard containing alphanumeric keys operated by a human user, or a sensor. A sensor detects conditions in its vicinity and transforms those detections into physical expression compatible with the measurable phenomenon used to represent information in computer system 500. Other external devices coupled to bus 510, used primarily for interacting with humans, include a display device 514, such as a cathode ray tube (CRT) or a liquid crystal display (LCD), or plasma screen or printer for presenting text or images, and a pointing device 516, such as a mouse or a trackball or cursor direction keys, or motion sensor, for controlling a position of a small cursor image presented on the display 514 and issuing commands associated with graphical elements presented on the display 514. In some embodiments, for example, in embodiments in which the computer system 500 performs all functions automatically without human input, one or more of external input device 512, display device 514 and pointing device 516 is omitted.

In the illustrated embodiment, special purpose hardware, such as an application specific integrated circuit (ASIC) 520, is coupled to bus 510. The special purpose hardware is configured to perform operations not performed by processor 502 quickly enough for special purposes. Examples of application specific ICs include graphics accelerator cards for generating images for display 514, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 500 also includes one or more instances of a communications interface 570 coupled to bus 510. Communication interface 570 provides a one-way or two-way communication coupling to a variety of external devices that operate with their own processors, such as printers, scanners and external disks. In general the coupling is with a network link 578 that is connected to a local network 580 to which a variety of external devices with their own processors are connected. For example, communication interface 570 may be a parallel port or a serial port or a universal serial bus (USB) port on a personal computer. In some embodiments, communications interface 570 is an integrated services digital network (ISDN) card or a digital subscriber line (DSL) card or a telephone modem that provides an information communication connection to a corresponding type of telephone line. In some embodiments, a communication interface 570 is a cable modem that converts signals on bus 510 into signals for a communication connection over a coaxial cable or into optical signals for a communication connection over a fiber optic cable. As another example, communications interface 570 may be a local area network (LAN) card to provide a data communication connection to a compatible LAN, such as Ethernet. Wireless links may also be implemented. For wireless links, the communications interface 570 sends or receives or both sends and receives electrical, acoustic or electromagnetic signals, including infrared and optical signals, that carry information streams, such as digital data. For example, in wireless handheld devices, such as mobile telephones like cell phones, the communications interface 570 includes a radio band electromagnetic transmitter and receiver called a radio transceiver. In certain embodiments, the communications interface 570 enables connection to the communication network 105 for receiving web content and rendering rules at the UE 101.

The term "computer-readable medium" as used herein to refers to any medium that participates in providing information to processor 502, including instructions for execution. Such a medium may take many forms, including, but not limited to computer-readable storage medium (e.g., non-volatile media, volatile media), and transmission media. Non-transitory media, such as non-volatile media, include, for example, optical or magnetic disks, such as storage device 508. Volatile media include, for example, dynamic memory 504. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read. The term computer-readable storage medium is used herein to refer to any computer-readable medium except transmission media.

Logic encoded in one or more tangible media includes one or both of processor instructions on a computer-readable storage media and special purpose hardware, such as ASIC 520.

Network link 578 typically provides information communication using transmission media through one or more networks to other devices that use or process the information. For example, network link 578 may provide a connection through local network 580 to a host computer 582 or to equipment 584 operated by an Internet Service Provider (ISP). ISP equipment 584 in turn provides data communication services through the public, world-wide packet-switching communication network of networks now commonly referred to as the Internet 590.

A computer called a server host 592 connected to the Internet hosts a process that provides a service in response to information received over the Internet. For example, server host 592 hosts a process that provides information representing video data for presentation at display 514. It is contemplated that the components of system 500 can be deployed in various configurations within other computer systems, e.g., host 582 and server 592.

At least some embodiments of the invention are related to the use of computer system 500 for implementing some or all of the techniques described herein. According to one embodiment of the invention, those techniques are performed by computer system 500 in response to processor 502 executing one or more sequences of one or more processor instructions contained in memory 504. Such instructions, also called computer instructions, software and program code, may be read into memory 504 from another computer-readable medium such as storage device 508 or network link 578. Execution of the sequences of instructions contained in memory 504 causes processor 502 to perform one or more of the method steps described herein. In alternative embodiments, hardware, such as ASIC 520, may be used in place of or in combination with software to implement the invention. Thus, embodiments of the invention are not limited to any specific combination of hardware and software, unless otherwise explicitly stated herein.

The signals transmitted over network link 578 and other networks through communications interface 570, carry information to and from computer system 500. Computer system 500 can send and receive information, including program code, through the networks 580, 590 among others, through network link 578 and communications interface 570. In an example using the Internet 590, a server host 592 transmits program code for a particular application, requested by a message sent from computer 500, through Internet 590, ISP equipment 584, local network 580 and communications interface 570. The received code may be executed by processor 502 as it is received, or may be stored in memory 504 or in storage device 508 or other non-volatile storage for later execution, or both. In this manner, computer system 500 may obtain application program code in the form of signals on a carrier wave.

Various forms of computer readable media may be involved in carrying one or more sequence of instructions or data or both to processor 502 for execution. For example, instructions and data may initially be carried on a magnetic disk of a remote computer such as host 582. The remote computer loads the instructions and data into its dynamic memory and sends the instructions and data over a telephone line using a modem. A modem local to the computer system 500 receives the instructions and data on a telephone line and uses an infra-red transmitter to convert the instructions and data to a signal on an infra-red carrier wave serving as the network link 578. An infrared detector serving as communications interface 570 receives the instructions and data carried in the infrared signal and places information representing the instructions and data onto bus 510. Bus 510 carries the information to memory 504 from which processor 502 retrieves and executes the instructions using some of the data sent with the instructions. The instructions and data received in memory 504 may optionally be stored on storage device 508, either before or after execution by the processor 502.

Figure 6:
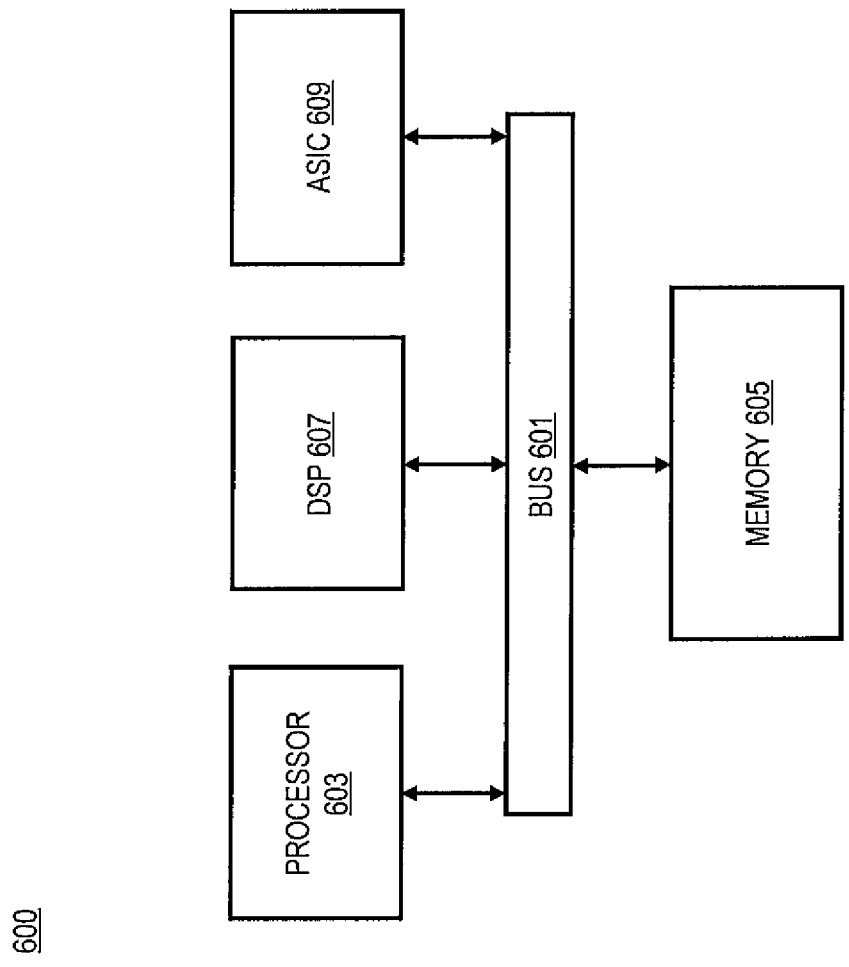
FIG. 6 is a diagram of a chip set that can be used to implement an embodiment of the invention.

FIG. 6 illustrates a chip set 600 upon which an embodiment of the invention may be implemented. Chip set 600 is programmed to render web content utilizing external rendering rules as described herein and includes, for instance, the processor and memory components described with respect to FIG. 5 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip. Chip set 600, or a portion thereof, constitutes a means for performing one or more steps of rendering web content utilizing external rendering rules.

In one embodiment, the chip set 600 includes a communication mechanism such as a bus 601 for passing information among the components of the chip set 600. A processor 603 has connectivity to the bus 601 to execute instructions and process information stored in, for example, a memory 605. The processor 603 may include one or more processing cores with each core configured to perform independently. A multi-core processor enables multiprocessing within a single physical package. Examples of a multi-core processor include two, four, eight, or greater numbers of processing cores. Alternatively or in addition, the processor 603 may include one or more microprocessors configured in tandem via the bus 601 to enable independent execution of instructions, pipelining, and multithreading. The processor 603 may also be accompanied with one or more specialized components to perform certain processing functions and tasks such as one or more digital signal processors (DSP) 607, or one or more application-specific integrated circuits (ASIC) 609. A DSP 607 typically is configured to process real-world signals (e.g., sound) in real time independently of the processor 603. Similarly, an ASIC 609 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 603 and accompanying components have connectivity to the memory 605 via the bus 601. The memory 605 includes both dynamic memory (e.g., RAM, magnetic disk, writable optical disk, etc.) and static memory (e.g., ROM, CD-ROM, etc.) for storing executable instructions that when executed perform the inventive steps described herein to render web content utilizing external rendering rules. The memory 605 also stores the data associated with or generated by the execution of the inventive steps.

Figure 7:
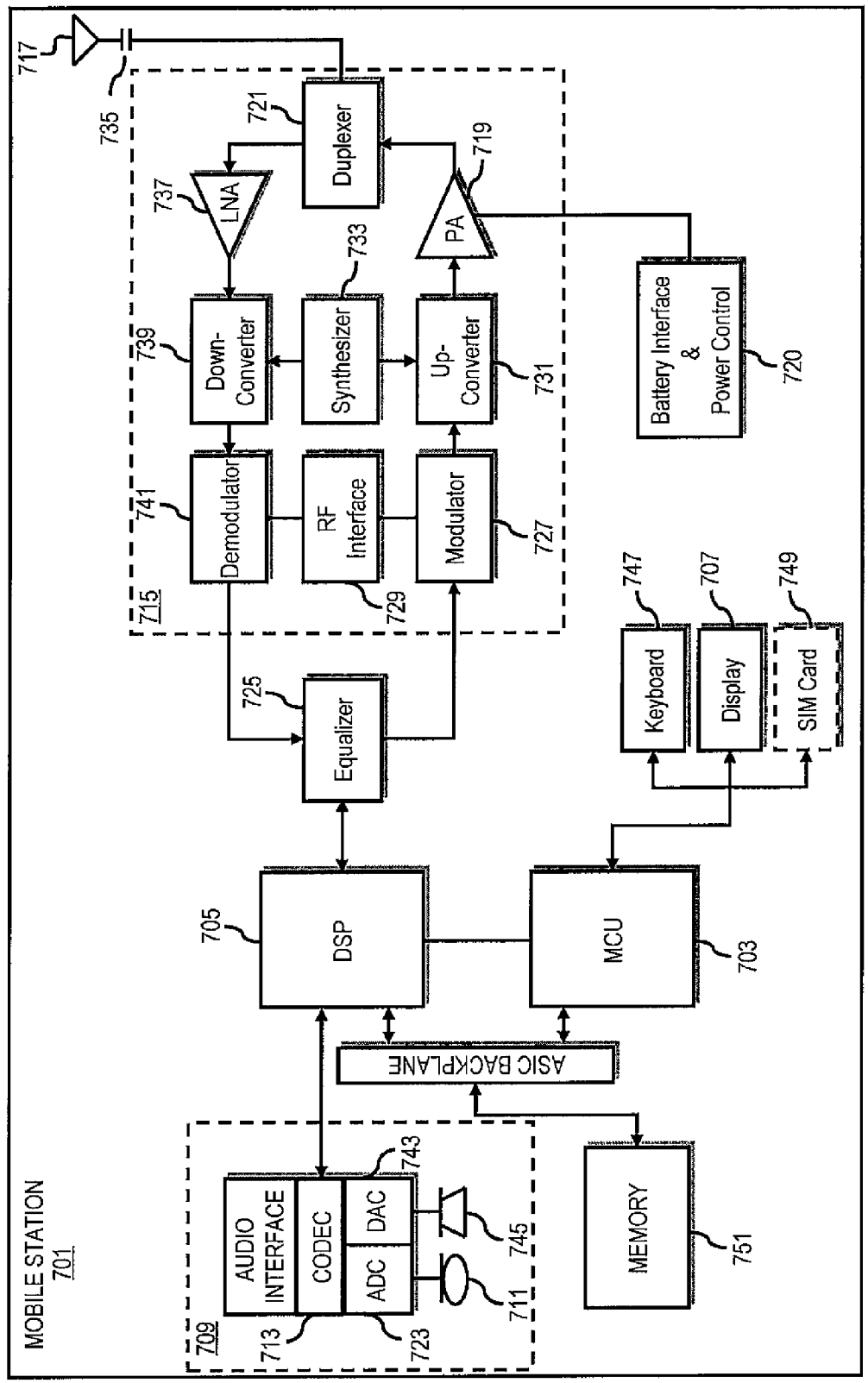
FIG. 7 is a diagram of a mobile terminal (e.g., handset) that can be used to implement an embodiment of the invention.

FIG. 7 is a diagram of exemplary components of a mobile terminal (e.g., handset) for communications, which is capable of operating in the system of FIG. 1, according to one embodiment. In some embodiments, mobile terminal 700, or a portion thereof, constitutes a means for performing one or more steps of rendering web content utilizing external rendering rules. Generally, a radio receiver is often defined in terms of front-end and back-end characteristics. The front-end of the receiver encompasses all of the Radio Frequency (RF) circuitry whereas the back-end encompasses all of the baseband processing circuitry. As used in this application, the term "circuitry" refers to both: (1) hardware-only implementations (such as implementations hi only analog and/or digital circuitry), and (2) to combinations of circuitry and software (and/or firmware) (such as, if applicable to the particular context, to a combination of processor(s), including digital signal processor(s), software, and memory(ies) that work together to cause an apparatus, such as a mobile phone or server, to perform various functions). This definition of "circuitry" applies to all uses of this term in this application, including in any claims. As a further example, as used in this application and if applicable to the particular context, the term "circuitry" would also cover an implementation of merely a processor (or multiple processors) and its (or their) accompanying software/or firmware. The term "circuitry" would also cover if applicable to the particular context, for example, a baseband integrated circuit or applications processor integrated circuit in a mobile phone or a similar integrated circuit in a cellular network device or other network devices.

Pertinent internal components of the telephone include a Main Control Unit (MCU) 703, a Digital Signal Processor (DSP) 705, and a receiver/transmitter unit including a microphone gain control unit and a speaker gain control unit. A main display unit 707 provides a display to the user in support of various applications and mobile terminal functions that perform or support the steps of rendering web content utilizing external rendering rules. The display 7 includes display circuitry configured to display at least a portion of a user interface of the mobile terminal (e.g., mobile telephone). Additionally, the display 707 and display circuitry are configured to facilitate user control of at least some functions of the mobile terminal. An audio function circuitry 709 includes a microphone 711 and microphone amplifier that amplifies the speech signal output from the microphone 711. The amplified speech signal output from the microphone 711 is fed to a coder/decoder (CODEC) 713.

A radio section 715 amplifies power and converts frequency in order to communicate with a base station, which is included in a mobile communication system, via antenna 717. The power amplifier (PA) 719 and the transmitter/modulation circuitry are operationally responsive to the MCU 703, with an output from the PA 719 coupled to the duplexer 721 or circulator or antenna switch, as known in the art. The PA 719 also couples to a battery interface and power control unit 720.

In use, a user of mobile terminal 701 speaks into the microphone 711 and his or her voice along with any detected background noise is converted into an analog voltage. The analog voltage is then converted into a digital signal through the Analog to Digital Converter (ADC) 723. The control unit 703 routes the digital signal into the DSP 705 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wideband code division multiple access (WCDMA), wireless fidelity (WiFi), satellite, and the like.

The encoded signals are then routed to an equalizer 725 for compensation of any frequency-dependent impairments that occur during transmission though the air such as phase and amplitude distortion. After equalizing the bit stream, the modulator 727 combines the signal with a RF signal generated in the RF interface 729. The modulator 727 generates a sine wave by way of frequency or phase modulation. In order to prepare the signal for transmission, an up-converter 731 combines the sine wave output from the modulator 727 with another sine wave generated by a synthesizer 733 to achieve the desired frequency of transmission. The signal is then sent through a PA 719 to increase the signal to an appropriate power level. In practical systems, the PA 719 acts as a variable gain amplifier whose gain is controlled by the DSP 705 from information received from a network base station. The signal is then filtered within the duplexer 721 and optionally sent to an antenna coupler 735 to match impedances to provide maximum power transfer. Finally, the signal is transmitted via antenna 717 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile terminal 701 are received via antenna 717 and immediately amplified by a low noise amplifier (LNA) 737. A down-converter 739 lowers the carrier frequency while the demodulator 741 strips away the RF leaving only a digital bit stream. The signal then goes through the equalizer 725 and is processed by the DSP 705. A Digital to Analog Converter (DAC) 743 converts the signal and the resulting output is transmitted to the user through the speaker 745, all under control of a Main Control Unit (MCU) 703—which can be implemented as a Central Processing Unit (CPU) (not shown).

The MCU 703 receives various signals including input signals from the keyboard 747. The keyboard 747 and/or the MCU 703 in combination with other user input components (e.g., the microphone 711) comprise a user interface circuitry for managing user input. The MCU 703 runs a user interface software to facilitate user control of at least some functions of the mobile terminal 701 to render web content utilizing external rendering rules. The MCU 703 also delivers a display command and a switch command to the display 707 and to the speech output switching controller, respectively. Further, the MCU 703 exchanges information with the DSP 705 and can access an optionally incorporated SIM card 749 and a memory 751. In addition, the MCU 703 executes various control functions required of the terminal. The DSP 705 may, depending upon the implementation, perform any of a variety of conventional digital processing functions on the voice signals. Additionally, DSP 705 determines the background noise level of the local environment from the signals detected by microphone 711 and sets the gain of microphone 711 to a level selected to compensate for the natural tendency of the user of the mobile terminal 701.

The CODEC 713 includes the ADC 723 and DAC 743. The memory 751 stores various data including call incoming tone data and is capable of storing other data including music data received via, e.g., the global Internet. The software module could reside in RAM memory, flash memory, registers, or any other form of writable storage medium known in the art. The memory device 751 may be, but not limited to, a single memory, CD, DVD, ROM, RAM, EEPROM, optical storage, or any other non-volatile storage medium capable of storing digital data.

An optionally incorporated SIM card 749 carries, for instance, important information, such as the cellular phone number, the carrier supplying service, subscription details, and security information. The SIM card 749 serves primarily to identify the mobile terminal 701 on a radio network. The card 749 also contains a memory for storing a personal telephone number registry, text messages, and user specific mobile terminal settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
    receiving web content associated with a particular rendering rule, the received web content being configured to include both static and non-static information;
    while receiving the web content, rendering the web content according to a default rendering rule;
    receiving the particular rendering rule;
    after receiving the particular rendering rule, determining a viewpoint of the web content; and
    re-rendering the web content according to the particular rendering rule at the viewpoint,
    wherein the received web content associated with the particular rendering rule that is rendered according to the default rendering rule and then re-rendered according to the particular rendering rule comprises content for which a size, shape, and font can change according to the particular rendering rule.

2. A method of claim 1, further comprising:
    causing, at least in part, presentation of the web content via a graphical user interface;
    retrieving a viewpoint selection criteria specifying a location within the graphical user interface,
    wherein the viewpoint is determined based on the location, and
    wherein the location includes a top left section of the graphical user interface or a center section of the graphical user interface.

3. A method according to claim 1, wherein the viewpoint is associated with a section of the web content, the method further comprising:
    receiving an input specifying the section, wherein the viewpoint determination is based on the input.

4. A method according to claim 1, wherein the web content includes one or more web content sections,
    the method further comprising:
    causing, at least in part, presentation of the web content via a graphical user interface; and
    determining a presentation area for each of the web content sections,
    wherein the viewpoint determination is based on the presentation area, the method further comprising:
    determining the web content sections based on div elements associated with the web content.

5. A method according to claim 1, wherein the particular rendering rule is based upon a Cascading Style Sheet.

6. A method according to claim 1, further comprising:
    causing, at least in part, presentation of the web content via a graphical user interface; and
    automatically focusing on the viewpoint of the re-rendered web content via the graphical user interface based on the receiving of the particular rendering rule.

7. An apparatus comprising:
    at least one processor; and
    at least one memory including computer program code,
    the at least one memory and the computer program code configured to, with the at least one processor, cause the apparatus to perform at least the following,
        receive web content associated with a particular rendering rule, the received web content being configured to include both static and non-static information;
        while receiving the web content, render the web content according to a default rendering rule;

receive the particular rendering rule; after receiving the particular rendering rule, determine a viewpoint of the web content; and re-render the web content according to the particular rendering rule at the viewpoint, wherein the received web content associated with the particular rendering rule that is rendered according to the default rendering rule and then re-rendered according to the particular rendering rule comprises content for which a size, shape, and font can change according to the particular rendering rule.

8. An apparatus of claim 7, wherein the apparatus is further caused, at least in part, to:

cause, at least in part, presentation of the web content via a graphical user interface;

retrieve a viewpoint selection criteria specifying a location within the graphical user interface, wherein the viewpoint is determined based on the location, and wherein the location includes a top left section of the graphical user interface or a center section of the graphical user interface.

9. An apparatus according to claim 7, wherein the viewpoint is associated with a section of the web content, and wherein the apparatus is further caused, at least in part, to:

receive an input specifying the section, wherein the viewpoint determination is based on the input.

10. An apparatus according to claim 7, wherein the web content includes one or more web content sections, wherein the apparatus is further caused, at least in part, to:

cause, at least in part, presentation of the web content via a graphical user interface;

determine a presentation area for each of the web content sections, wherein the viewpoint determination is based on the presentation area and, wherein the apparatus is further caused, at least in part, to: determine the web content sections based on div elements associated with the web content.

11. An apparatus according to claim 7, wherein the particular rendering rule is based upon a Cascading Style Sheet.

12. An apparatus according to claim 7, wherein the apparatus is further caused, at least in part, to:

cause, at least in part, presentation of the web content via a graphical user interface; and automatically focus on the viewpoint of the re-rendered web content via the graphical user interface based on the receiving of the particular rendering rule.

13. An apparatus according to claim 7, wherein the apparatus is a mobile phone further comprising:

user interface circuitry and user interface software configured to facilitate user control of at least some functions of the mobile phone through use of a display and configured to respond to user input; and a display and display circuitry configured to display at least a portion of a user interface of the mobile phone, the display and display circuitry configured to facilitate user control of at least some functions of the mobile phone.

14. A non-transitory computer-readable storage medium carrying one or more sequences of one or more instructions which, when executed by one or more processors, cause an apparatus to at least perform the following:

receiving web content associated with a particular rendering rule, the received web content including text, links, images, video, audio, other media, and other information stored on a web page and/or a website;

while receiving the web content, rendering the web content according to a default rendering rule; receiving the particular rendering rule;

after receiving the particular rendering rule, determining a viewpoint of the web content; and re-rendering the web content according to the particular rendering rule at the viewpoint, wherein the received web content associated with the particular rendering rule that is rendered according to the default rendering rule and then re-rendered according to the particular rendering rule comprises content for which a size, shape, and font can change according to the particular rendering rule.

15. A non-transitory computer-readable storage medium of claim 14, wherein the apparatus is caused, at least in part, to further perform:

causing, at least in part, presentation of the web content via a graphical user interface;

retrieving a viewpoint selection criteria specifying a location within the graphical user interface, wherein the viewpoint is determined based on the location, and wherein the location includes a top left section of the graphical user interface or a center section of the graphical user interface.

16. A non-transitory computer-readable storage medium according to claim 14, wherein the viewpoint is associated with a section of the web content, and wherein the apparatus is caused, at least in part, to further perform:

receiving an input specifying the section, wherein the viewpoint determination is based on the input.

17. A non-transitory computer-readable storage medium according to claim 14, wherein the web content includes one or more web content sections, and wherein the apparatus is caused, at least in part, to further perform:

causing, at least in part, presentation of the web content via a graphical user interface; and determining a presentation area for each of the web content sections, wherein the viewpoint determination is based on the presentation area, and further:

determining the web content sections based on div elements associated with the web content.

18. A non-transitory computer-readable storage medium according to claim 14, wherein the particular rendering rule is based upon a Cascading Style Sheet.

19. A non-transitory computer-readable storage medium according to claim 14, wherein the apparatus is caused, at least in part, to further perform:

causing, at least in part, presentation of the web content via a graphical user interface; and automatically focusing on the viewpoint of the re-rendered web content via the graphical user interface based on the receiving of the particular rendering rule.

* * * * *